Nov. 17, 1942.   E. A. KEELER   2,302,036
GAS ANALYSIS APPARATUS
Filed July 19, 1939   3 Sheets-Sheet 1

INVENTOR.
EARL A. KEELER
BY
ATTORNEY

Nov. 17, 1942.  E. A. KEELER  2,302,036
GAS ANALYSIS APPARATUS
Filed July 19, 1939   3 Sheets-Sheet 2

INVENTOR.
EARL A. KEELER
BY *George M. Beauchamp*
ATTORNEY

Nov. 17, 1942.  E. A. KEELER  2,302,036
GAS ANALYSIS APPARATUS
Filed July 19, 1939  3 Sheets-Sheet 3
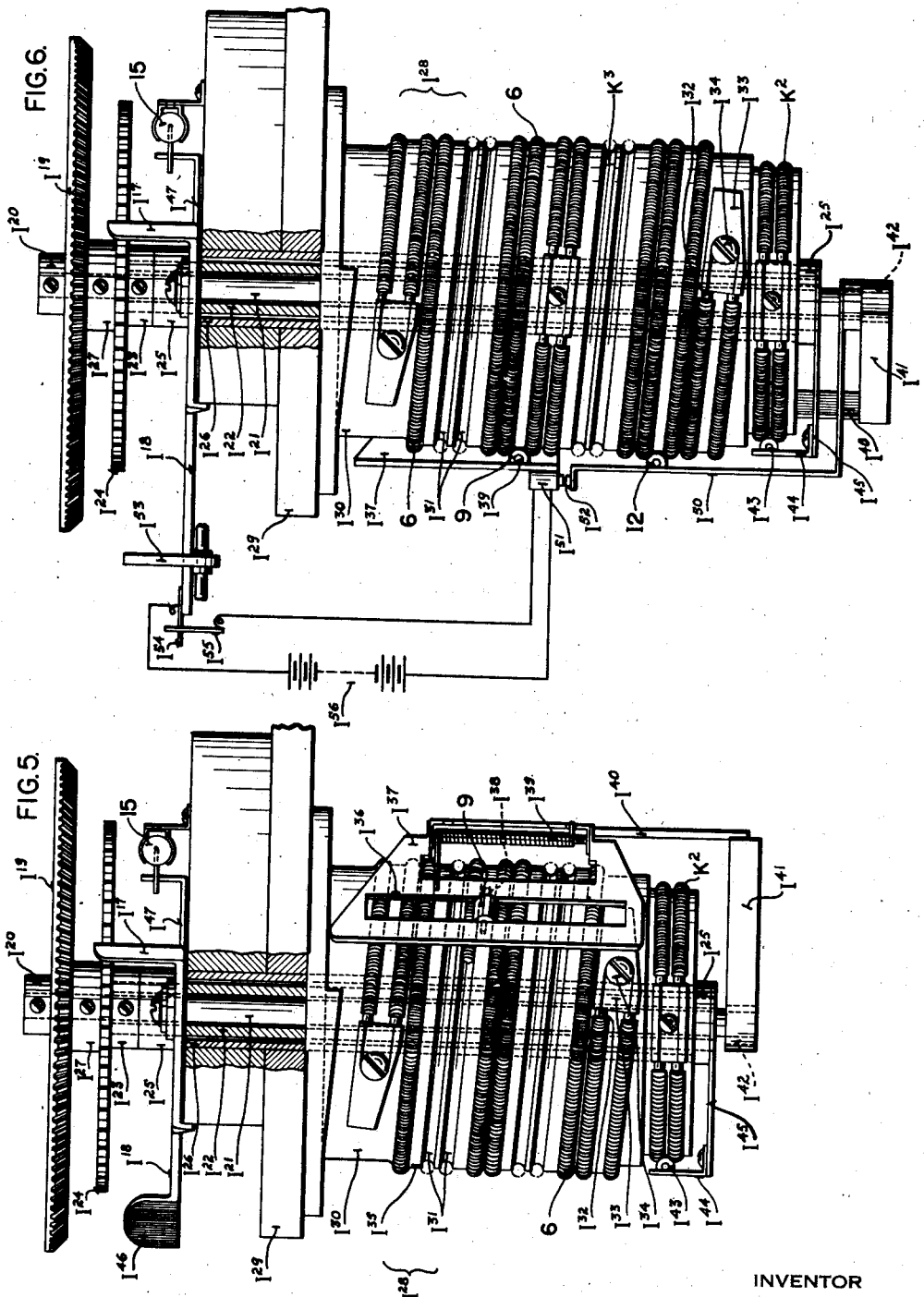
INVENTOR
EARL A. KEELER
ATTORNEY Patented Nov. 17, 1942

2,302,036

UNITED STATES PATENT OFFICE 2,302,036

GAS ANALYSIS APPARATUS

Earl A. Keeler, Norristown, Pa., assignor to The Brown Instrument Company, Philadelphia, Pa., a corporation of Pennsylvania Application July 19, 1939, Serial No. 285,236

12 Claims. (Cl. 73—51)

This invention relates to instrumentalities useful in gas analysis measurements and more particularly to improved means for calibrating such instruments.

An object of the invention is to provide a measuring instrument having simple and effective means for calibrating the instrument at any scale reading throughout its range of measurement.

A further object of the invention is to provide, in combination with a measuring instrument adapted to make measurements to one or another of two different scales, accordingly as the value of the quantity measured is above or below a certain intermediate value in the range of variation to which the instrument is capable of responding, simple and effective means for calibrating the instrument at any scale reading throughout its range of measurement.

There are various chemical methods of gas analysis theoretically available for use in determining the composition of atmospheres, for example, the atmospheres of furnaces used for heat treating operations, but the known chemical methods, available for laboratory work, are not practically suitable for the use of the operators of controlled atmosphere furnaces. Workers in the art have discovered, however, that it is practically possible for the furnace operators to obtain immediately useful and valuable knowledge concerning the composition of controlled furnace atmospheres by measuring the thermal conductivity of the gaseous mixture constituting said atmosphere with apparatus especially devised for that purpose. Such apparatus is characterized in particular by provisions for changing the measurement scale as the thermal conductivity varies from one side to the other of a certain intermediate value, so as to furnish suitably sensitive and accurate measurements both when the thermal conductivity of the furnace atmosphere is low and when it is relatively high.

The desirability of including such scale changing provisions will be readily appreciated when it is understood that the thermal conductivity of $CO^2$ which is a constituent found in furnace atmospheres, is less than six-tenths that of air and the thermal conductivity of $H^2$, another constituent found in furnace atmospheres, is nearly seven times that of air. Oxygen, nitrogen and carbon monoxide, which are also found in furnace atmospheres, have thermal conductivities differing only a few percent from that of air. In general, when a furnace atmosphere has a thermal conductivity less than that of air, there has been substantially complete combustion of the combustible elements supplied to form the atmosphere, and the difference between the thermal conductivities of the furnace atmosphere and air is proportional to and forms a measure of the $CO^2$ content of the atmosphere. On the other hand, when the thermal conductivity of such a furnace atmosphere is significantly above that of air, the difference will be due to the presence of $H^2$ in the atmosphere, and will constitute a measure of the hydrogen content of the atmosphere.

In one prior art embodiment of such thermal conductivity measuring apparatus, the deflection range of the measuring instrument is divided into substantially equal high and low deflection sections, separated by a narrow intermediate section, and means are provided for changing the scale of the measurements so that the low deflection section may be effectively utilized in determining the $CO^2$ content of the atmosphere, through the normal range of variation in that content from zero up to about 14%, and so that the high deflection section may be effectively utilized in measuring the $H^2$ content of the atmosphere, which may vary from zero up to 100%, though in the normal intended use of most such furnaces, the $H^2$ content will be substantially less than 100%.

As will be understood by those skilled in the art, in the use of any particular combustible gas to maintain a controlled furnace atmosphere in any particular furnace for any one particular heat treating operation, the furnace atmosphere composition should be maintained approximately constant, and may be so maintained by the use of the thermal conductivity measuring apparatus described more in detail hereinafter.

As will be readily apparent, in order to maintain the furnace atmosphere constant, it is of the utmost importance that the instrument readings be correct, and, in accordance with my invention, I provide means whereby the calibration of the instrument may be readily checked at any point throughout its range of measurement. Such check is for the purpose of determining the necessity for recalibration of the instrument to compensate for variations in the voltage of the battery supplying energizing current to the instrument. Heretofore, it has been necessary to calibrate such thermal conductivity measuring apparatus at an arbitrary scale value so chosen that the sensitivity and accuracy of the instrument through its range of measurement would be optimum values, and if such instruments following initial calibration, were recalibrated at any point other than said arbitrary value, the instrument reading would be rendered inaccurate at the point at which it was so calibrated and also at every other point throughout its entire scale. Such inaccuracies introduced into the instrument readings are slight when the thermal conductivity of the gas under measurement is nearly the same as that of air, but when the thermal conductivity of the gas under measurement is widely displaced from that of air, they are significant and heretofore have required that the instruments be recalibrated always at said arbitrary point in its scale as noted. This feature has been objectionable because the calibration of the instrument is confined to one point only thereby requiring, whenever it is desired to make a check of the instrument calibration, that the gas under measurement have a predetermined composition. This necessitates stopping the flow of gas to the measuring apparatus and purging the latter to remove all traces of the gas and thereafter supplying gas of known composition to the apparatus. As will be readily apparent, this is a tedious and lengthy operation and is otherwise undesirable because of the necessity for interrupting the measurements of the furnace atmosphere.

Accordingly it is a primary object of the present invention to provide means whereby instruments of the type described may be readily calibrated at any point throughout their range of measurement.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Figure 3:
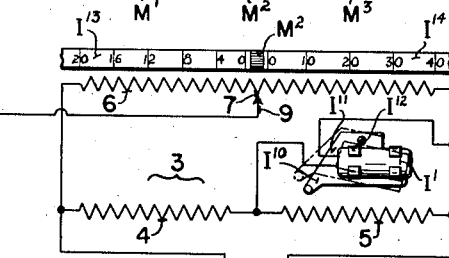
Fig. 3 is a wiring diagram illustrating a preferred measuring circuit arrangement for use in and as a part of the apparatus diagrammatically shown in Fig. 1.
Figure 4:
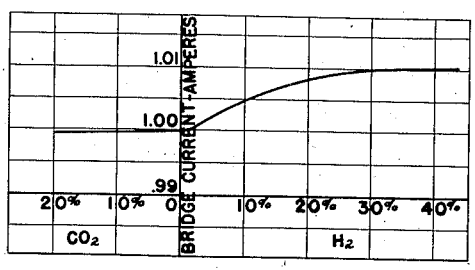

Fig. 4 is a graph illustrating the changes in current supplied the comparison cell of Figs. 1 and 3 with changes in gas thermal conductivity; and Figs. 5 and 6 illustrate modifications of the arrangement described in connection with Figs. 2 and 3.

Figure 1:
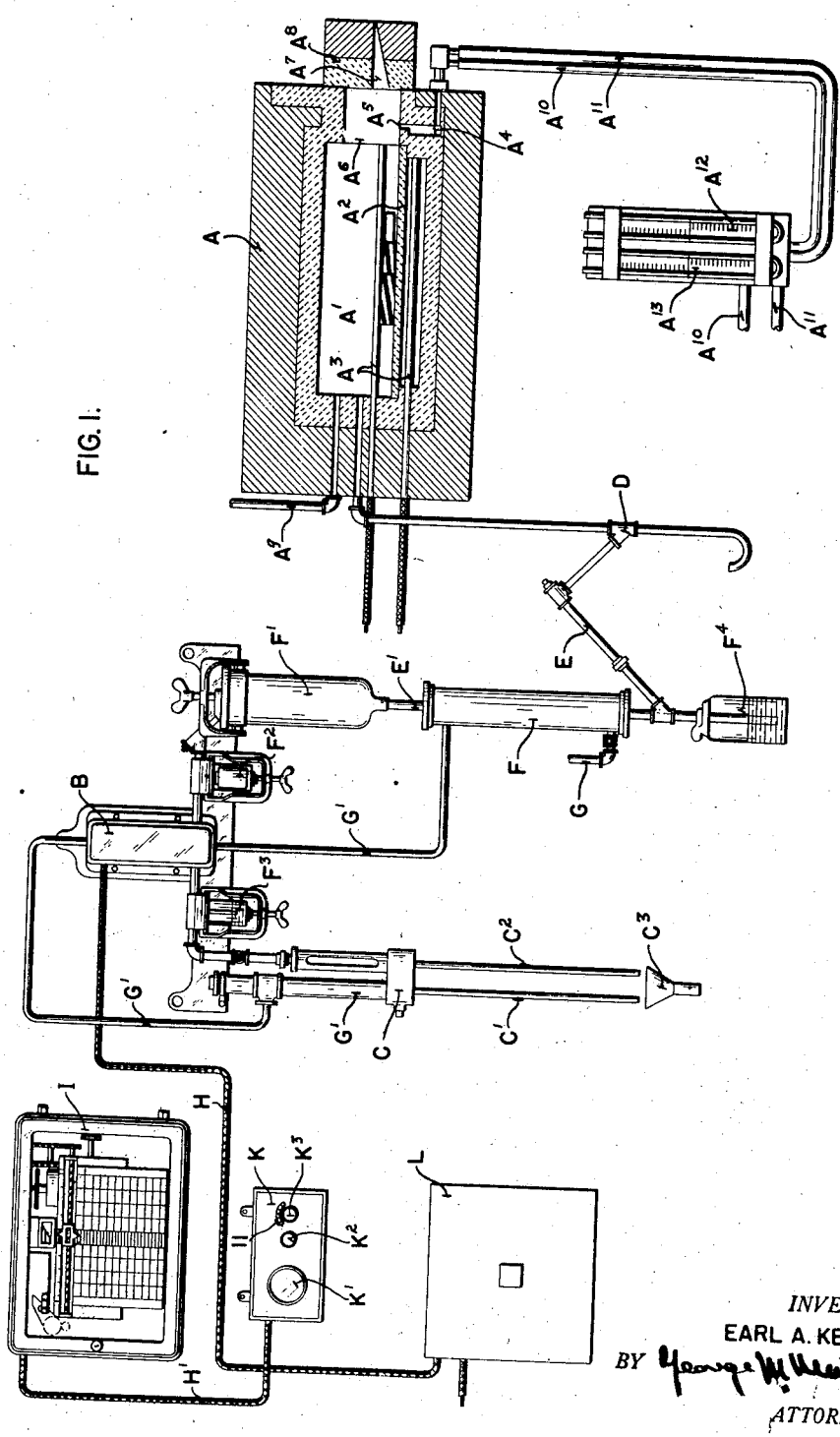
Fig. 1 is a diagrammatic view illustrating the use of the present invention in connection with a treating furnace of well known commercial type.

In Fig. 1 I have illustrated, more or less diagrammatically, the apparatus embodying my invention as adapted for use in analyzing the atmosphere in a furnace A, and for indicating and recording the analysis results. The furnace A shown in the drawings is of well known commercial type in extensive use for the heat treatment of tools and analogous metallic articles which while being treated, must be enveloped in an atmosphere of definite composition and closely controlled, to obtain the best heat treatment results. As shown, the metal tools or other parts treated are supported in the furnace chamber A', on a refractory support $A^2$, which extends across the chamber, and about which the furnace chamber atmosphere may circulate. Within the chamber are resistance bars or other suitable electric heating elements $A^3$.

A suitable atmosphere forming, fuel gas is burned in a precombustion chamber $A^4$, formed in the refractory housing of the chamber A', and from which products of combustion pass through a port $A^5$ into the throat $A^6$ of the chamber A'. The port $A^5$ is in the form of a narrow slot in the bottom wall of the throat. The combustion occurring in the chamber $A^4$ may be regulated to provide gaseous products of combustion having the composition desirably maintained in the chamber A'. Those products are discharged through the port $A^5$ in a sheet-like jet, forming a curtain extending across the throat $A^6$. Such a curtain is effective to prevent atmospheric air from passing into the furnace chamber through the peephole $A^7$, shown as formed in the door $A^8$ normally closing the outer end of the throat, and is also effective to prevent the influx of air when the door is opened. In the furnace conventionally illustrated, means are provided for increasing the volume of products formed in the chamber $A^4$ and discharged across the throat $A^6$, during each period in which the door $A^8$ is displaced from its normally closed position.

In addition to its curtain forming effect, the combustion gases discharged through the port $A^6$, displace objectionable atmospheric constituents which may be within the chamber A' at the beginning of a heat treating operation. Excess products of combustion escape from the chamber A' through its vent outlet $A^9$. As shown, gas, and air for its combustion, are supplied to the chamber $A^4$ through pipes $A^{10}$ and $A^{11}$, respectively, and $A^{12}$ and $A^{13}$ represent gauges associated with the pipes $A^{10}$ and $A^{11}$, respectively, to provide measures of the rates of flow through the pipes, and guidance for the adjustment of valves controlling said rates of flow, so as to insure the desired composition for the products of combustion.

The present invention is not limited to use in connection with a furnace similar in type or kind to the furnace A, and the latter forms no part of the present invention, but the use to which such a furnace A is ordinarily put, is one in which the present invention may be used with great advantage, and so as to permit a highly efficient use of the special provisions made to measure atmospheric conditions in the furnace chamber A'.

In the form shown in Fig. 1, the gas analyzing apparatus associated with the furnace A comprises an aspirator C constantly moving a stream of gas from the furnace chamber A' through the test cell or cells of a thermal conductivity comparison cell structure B, along a flow path comprising a sampling tube D, conduit sections E and E', and gas conditioning elements F, F', and $F^2$.

In many cases the exhaust gases from the equipment illustrated in Fig. 1 are obnoxious, inflammable or otherwise undesirable and under such circumstances I may dispense with the aspirator and provide a continuous pipe line from the outlet of the cell B back to the furnace A. A circulating pump may then be inserted in the said pipe line for drawing gases through connections D, E, $F^4$, F, E', F', $F^2$, B, $F^3$ and the pump back into the furnace. This method is desirable also from the standpoint of the maintenance of the desirable gas pressure and flow.

The comparison cell structure B can be of any usual or suitable type, and in particular it may, and will be herein assumed to be, of the type disclosed in the Harrison Patents 1,818,619, granted August 11, 1931, and No. 1,829,649, granted October 27, 1931, in which two test gas and two standard gas cells of cylindrical form, are arranged side by side in a one-piece metallic cell block, an electric current carrying resistor being arranged in each cell. In using such a cell structure in the arrangement of Fig. 1, the test gas withdrawn from the chamber A', is passed in separate parallel streams continuously through the two test gas cells, and the standard gas in the other two cells may be air sealed in those cells. The two test cell resistors BR and the two standard cell resistors $br$ are connected in a suitable measuring circuit, a preferred form of which is shown in Fig. 3, so that the changes in relative resistance of the resistors in the test and standard gas cells, due to differences in their temperatures produced by differences in the thermal conductivities of the test and standard gases, create potential changes in the circuit which can be measured.

In order that the composition of the gas in a heat treating furnace chamber such as the chamber A', may be determined with suitable accuracy, it is necessary to avoid contamination or modification in the composition of the gas as a result of the contact of the gas, while at a high temperature, with the walls of the flowpath. To this end, the sampling tube D may well be made of the refractory ceramic material known as sillimanite, and the adjacent section of the flowpath, for the length of 20 feet or so required to cool the gas down approximately to an atmospheric temperature, may well be in the form of a lead tube.

Accuracy of measurement requires that the test gas should pass through conditioning means by which the gas is brought to a certain standard condition, in respect to temperature, moisture content, and freedom from impurities, before entering the test cells, and that the general temperature of the test cell structure should be kept approximately constant. To these ends, the gas conditioning means illustrated in Fig. 1 comprise a gas cooler or condenser F, a gas dryer F', and a gas cleaning filter $F^2$. Backflow of air into the test cells through the aspirator C is prevented by a glycerin seal $F^3$. Liquid separating from the gas in the condenser F is received in a receptacle $F^4$ providing a liquid seal between the atmosphere and the gas space in the condenser. The condenser and cell structure B are cooled by water supplied by a pipe G to a cooling space in the condenser F, from which the water passes through pipe connections G' and a cooling space in the cell structure B to the aspirator C, in which the water serves as the motive fluid for creating a suitable and suitably constant suction at the outlet of the seal $F^3$. The water, and the gas drawn by it into the aspirator C, escape from the latter through downwardly directed discharge pipes C' and $C^2$, the drip from which is received by a sump connection $C^3$.

The cable sections H and H' shown in Fig. 1 include the conductors employed to operatively interconnect the cell resistors in the comparison cell structure B, the recording instrument I, a control panel K, including an ammeter K', a rheostat $K^2$ for adjusting the energizing current flow through the cell resistors to the proper value, a rheostat $K^3$ provided for facilitating the instrument calibration, and a source of current L. The latter may be a battery, or in some cases it may advantageously be an A. C. adapter, energized from an alternating current supply source and including rectifying means and potentiometer or other means for impressing suitable direct current voltages on the cell resistors and the potentiometric instrument.

In the desirable cell resistor and measuring circuit arrangement shown diagrammatically in Fig. 3, the two test cell resistors BR of the cell structure B, are included in opposing arms of a Wheatstone bridge $b$, each of the other two arms of which include a corresponding one of the two standard gas cell resistors $br$. As shown, one of the two energizing junctions, 1, of the bridge $b$, is the point of engagement of a calibrating switch arm $b'$ with a slidewire resistance $b^2$. The latter is connected through the bridge network $b$ to the second bridge energization junction 2. The bridge energizing source of current, shown in Fig. 3 as a battery LA, the control panel ammeter K', rheostats $K^2$ and $K^3$, and the switch arm $b'$ are connected in series with one another between the bridge energizing junctions 1 and 2.

As illustrated, two opposed bridge network resistors $br$ and BR are connected in series between the bridge energizing junctions 1 and 2 and the remaining resistors $br$ and BR are connected in series circuit relation between the bridge energizing junctions with a parallel network 3, the latter of which is connected between the resistors. The parallel network 3 includes a pair of resistors 4 and 5 connected in series in one branch and a resistor 6 in the other branch. The circuit functions of resistors 4, 5 and 6, which are preferably included in the recording instrument I, will be described in detail hereinafter.

In operation, the rheostat $K^2$ is adjusted from time to time as required to maintain the bridge energizing current flow at the desired value as determined in a manner described hereinafter. The switch arm $b'$ is adjusted along the slidewire resistance $b^2$ for initially adjusting the distribution of flow through the two branches connecting the junctions 1 and 2 when the various cell resistors are subjected to standard temperature conditions.

When the composition of the gas in the test cells BR is a predetermined value, the bridge network $b$ will be balanced and the potentials of the bridge equalizing junctions 7 and 8 will be identical. As illustrated, the balancing junction 7 is the point of engagement of a switch arm 9 with the resistor 6, and the balancing junction 8 is the point of connection of the resistors BR and $br$ connected in the opposing arms of the bridge network.

On a change in composition of the test gas producing a change in composition thereof, the resultant change in resistance of the test cell resistors BR produces changes in opposite directions in the potentials of the bridge junctions 7 and 8. Those potential changes produce variations in the current flow in a circuit branch which connects the bridge junctions 7 and 8 and as shown, includes a galvanometer 10 which is desirably mounted in the instrument I and is provided for indicating the extent of unbalance of the bridge network and for effecting rebalancing of the bridge network by adjustment of switch arm 9 along resistor 6 in a manner to be described.

The instrument I includes provisions for shunting out or connecting in circuit the resistor 5 accordingly as the thermal conductivity of the test gas is above or below a certain standard which is predetermined, and which, for the ordinary use of the apparatus shown, is the thermal conductivity of the standard gas. Whether the resistor 5 is in circuit or shunted out of circuit depends upon whether an instrument switch I', shown as a mercury switch, is in its full line or its dotted line position shown in Fig. 3. As hereinafter described, the switch I' is adjusted between its two positions by movement in either direction of the recording pen carriage $I^7$ of the instrument I through an intermediate portion of its range of movement. The pen carriage $I^7$ and the rebalancing contact 9 are mechanically connected together so that adjustment of contact 9 to rebalance the bridge network $b$ also produces an adjustment of the pen carriage $I^7$.

Whether the potential difference between the junctions 7 and 8 of the bridge network $b$ will increase or decrease, as the thermal conductivity of the test gas increases, depends upon the relative resistances of the bridge arms including the different cell resistors and is a matter of instrument design. If, for example, the resistance of each bridge arm including a cell resistor BR is greater than the resistance of the bridge arm in series therewith for all temperatures of the resistors BR within the measuring range, the temperatures and resistances of those resistors, and the potential difference between the bridge junctions 7 and 8 will progressively decrease as the thermal conductivity of the test gas increases throughout the measuring range. As hereinafter appears, in a major contemplated field of use of the invention, the possible increases in thermal conductivity of the test gas above that of the standard gas, are of much greater extent than the possible decreases below the standard gas thermal conductivity. For such use, the apparatus collectively shown in Figs. 1, 2, and 3, may advantageously be arranged to tilt the switch I' from its full line position into its dotted line position, or in the reverse direction as the thermal conductivity of the test gas respectively decreases below or rises above a certain predetermined intermediate value.

Figure 2:
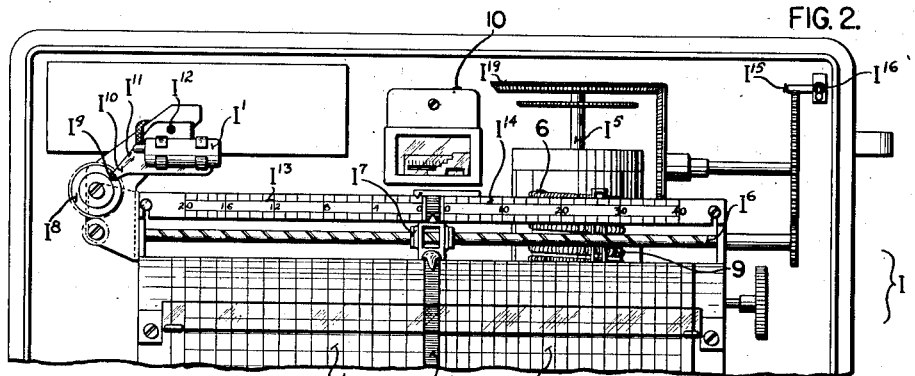
Fig. 2 is a partial front elevation of a recording potentiometer instrument included in the apparatus shown in Fig. 1.

The instrument I shown in Figs. 1 and 2 is a self balancing instrument of the type shown in the Harrison et al. Patent 2,150,502, issued March 14, 1939, and comprising periodically actuated relay mechanism controlled by the deflection of the galvanometer 10, on a change in the relative potentials of the bridge junctions 7 and 8, to angularly adjust a shaft $I^5$ and thereby move the contact 9 along the slide-wire resistor 6 in the direction to rebalance the instrument and for a distance which is dependent upon the extent of galvanometer deflection starting the rebalancing operation. The angular adjustment of the shaft $I^5$ is attended by a corresponding angular adjustment of a helically grooved shaft $I^6$. The rotation of the latter adjusts the pen or marker carriage $I^7$ longitudinally of the shaft $I^6$ with which the carriage is in threaded engagement.

The rotation of the shaft $I^6$ thus moves the recorder carriage transversely of a record sheet or strip which includes low and high conductivity sections M' and $M^3$ at opposite sides of a narrow central section $M^2$. As the recorder carriage moves the recording element in one direction or the other across the strip $M^2$, the switch I' is tilted from its full line position into its dotted line position, or in the opposite direction, accordingly as the carriage movement is to the right or to the left as seen in Fig. 2.

The switch I' is actuated by the rotation of the shaft $I^6$ through mechanism comprising a disc like actuating element $I^8$ rotated by and in accordance with the rotation of the shaft $I^6$ and formed with a notch $I^9$ adapted to receive a projection $I^{10}$ carried by a switch support $I^{11}$. The latter is mounted to oscillate about a supporting pivot $I^{12}$ in fixed relation with the instrument framework. In effect, the disc $I^8$ with its notch $I^9$ and the switch support $I^{11}$ with its projection $I^{10}$ form a Geneva-gear mechanism for tilting the switch I' in one direction or the other as the marking element moves in one direction or the other across the record strip $M^2$. Such a Geneva-gear mechanism is illustrated in detail in a copending application of Coleman B. Moore, bearing Serial Number 144,320 and filed May 22, 1937, and which issued as Patent 2,252,301 on August 12, 1941.

The actuating element $I^8$ comprises two side by side notched disc elements rotated at different angular speeds by the shaft $I^6$, and having their individual notches brought into register to collectively form the notch $I^9$ of the element $I^8$, only when the pen carriage marking element is alongside the chart section $M^2$. Such a two disc arrangement permits an angular velocity of the element $I^8$ great enough to shift the switch I' between its full and dotted line positions, on a comparatively small movement of the pen carriage $I^7$, so that the record chart strip $M^2$ may be suitably narrow.

In the use of the apparatus shown in Figs. 1, 2, and 3, the pen carriage will be displaced to the right or to the left as seen in Fig. 1, by increases and decreases, respectively, in the thermal conductivity of the test gas, but ordinarily, the position of the pen carriage along its path of travel can be expected to directly furnish information of more direct and immediate importance than the mere thermal conductivity of the gas. Under the operating conditions most usual in furnaces of the type illustrated in Fig. 1, the measurements recorded on the record chart strip M' will be thermal conductivity measurements obtained when the combustion of the gas supplied to the chamber $A^4$ has been complete. The thermal conductivity of the test gas will then vary substantially in inverse proportion to its $CO^2$ content, and the scale portion $I^{13}$ in register with the record strip M' may well be graduated and provided with scale marks to indicate the $CO^2$ precentage in the test gas.

Under the conditions described, the measurements on the chart strip $M^3$ will be measurements of the thermal conductivity of the test gas, obtained when that gas is reducing, and it's thermal conductivity is high because of its $H^2$ content. In consequence the scale portion $I^{14}$ in register with the chart strip $M^3$, may well be graduated and provided with scale marks to indicate the $H^2$ percentage of the gas. Whether the furnace chamber gas owes its reducing properties wholly or mainly to its $H^2$ content, or in substantial extent to its $CO^2$ content, does not materially effect the value of the measurements given in terms of an assumed $H^2$ content. If that assumed content is higher or lower than the operator has found satisfactory for the work in hand, the operator will know that conditions will be improved by respectively increasing or decreasing the ratio of air to gas supplied to the chamber $A^4$.

Under the operating conditions assumed, in an intermediate portion of the range of thermal conductivity variation, where the $H^2$ content of the gas may vary only from a little less, to a little more than 1% the thermal conductivity measurements do not give a reliable indication of the gas composition, and it is thus an advantage rather than a disadvantage to have the strip $M^2$ wide enough to cover the said intermediate range portion.

As illustrated in Figs. 1 and 3, the instrument includes calibration provisions comprising a scale 11 associated with the rheostat $K^3$, a contact 12 adjustable along the rheostat $K^3$, a standard cell 13, a resistor 14, and a double pole, double throw switch 15. When the switch 15 is adjusted into its full line position, the galvanometer 10 is connected across the bridge network terminals 7 and 8, but when the switch is adjusted into its dotted line position, the galvanometer 10 is included in a circuit including the standard cell 13, resistor 14, and a portion or all of rheostat $K^3$ depending upon the position of contact 12. The standard cell 13 is so connected in this circuit that its E. M. F. is in opposition to the potential drop produced in rheostat $K^3$ by the flow of bridge energizing current.

Referring to Fig. 4, it is noted that if the current supplied the bridge network is adjusted to a desirable value with a gas of given thermal conductivity in the test cells BR, the current value supplied the bridge network will change as the thermal conductivity of the gas in the test cells changes. That is to say, if the current supplied the bridge network is adjusted to a predetermined value with a gas of given thermal conductivity in the test cells, a different corresponding current value will flow through the bridge network with a gas of different thermal conductivity in the test cells. This effect results from the change in resistance of the test cell resistors with change in temperature, and in the case of a change in gas composition in the test cells from $CO^2$ to $H^2$, the effect is pronounced. Thus, in calibrating the instrument at any point in its range of measurement, account must be taken of the change in current occurring as the thermal conductivity of the gas changes so that the current supplied the bridge network will be correct after an adjustment at one gas thermal conductivity, for all other gas thermal conductivities throughout the range of the instrument.

In accordance with my present invention, the flow of current to the bridge network $b$ is adjusted to a value corresponding to the thermal conductivity of the gas in the test cells BR so that the instrument may be properly calibrated irrespective of the position of the contact 9 along resistor 6. As noted above, because of the high thermal conductivity of $H^2$, on a change from $CO^2$ to $H^2$ in the test cells, the test cell resistors BR will become cool and lower in resistance whereby the flow of energizing current to the bridge network will increase substantially. Such changes in current to the bridge network occur as a result of changes in $CO^2$ in the test cells, but such changes are relatively insignificant. When making $CO^2$ measurements, therefore, it is permissible, in some cases, to calibrate the instrument with any value of $CO^2$, within the instrument range, in the test cells, for the flow of bridge energizing current does not vary materially as the $CO^2$ content of the gas in the test cells change.

In the case of $H^2$ measurements, however, the increase in bridge energizing current on a change in $H^2$ content is substantial and so, if it is desired to calibrate the instrument with $H^2$ in the test cells, it is necessary to adjust the flow of current to the bridge network to a value corresponding to the particular value of $H^2$ content in the test cells. Since the changes in the flow of bridge energizing current with changes in $CO^2$ and $H^2$ are gradual, it is noted the flow of current to the bridge network may be adjusted to the value corresponding to the particular value of $CO^2$ or $H^2$ in the test cells to thereby facilitate the calibration operation of the apparatus.

In so calibrating the instrument, the composition of the gas in the test cells is first noted on the scales $M'$ or $M^3$, and then the contact 12 is manually adjusted to a point along the rheostat $K^3$ opposite the composition of gas noted and as read on scale 11. Switch 15 is then thrown to its dotted line position and the deflection of galvanometer 10 is noted. If the galvanometer is then undeflected, it will be known the instrument calibration is correct, but if the galvanometer is deflected, the rheostat $K^2$ is adjusted in the proper direction to reduce that deflection and when said deflection is zero it will be known that the instrument calibration is correct.

Figure 2A:
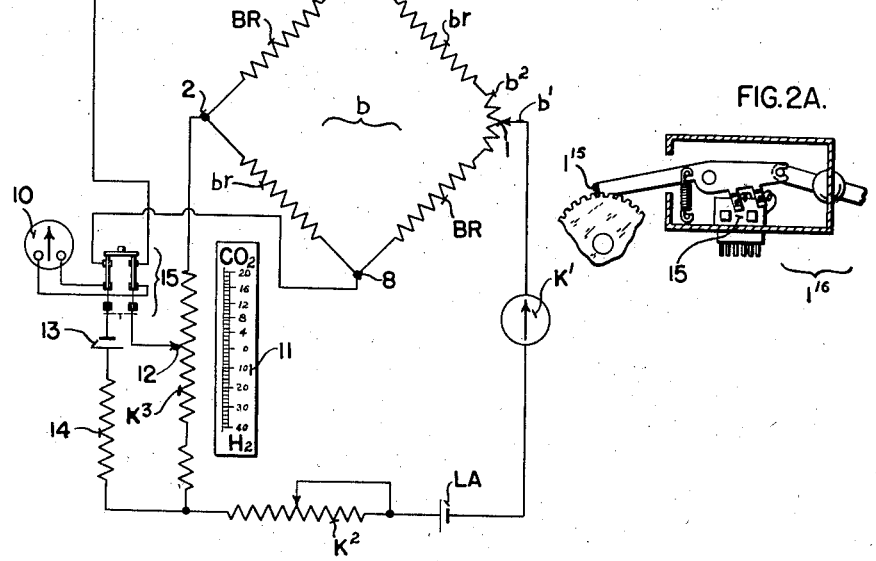
Fig. 2A is a detail view of the switch and detent mechanism of Fig. 2.

It will be apparent the calibrating adjustments described above may be effected automatically or semi-automatically by suitable means responsive to the deflection of the deflecting element of galvanometer 10 when the switch 15 is in its dotted line position. For example, the said calibrating adjustments may be effected semi-automatically by providing a mechanical connection between contact 12 and the bridge rebalancing contact 9 so that contact 12 moves relatively to its associated scale 11 in unison with the movement of the pen carriage $I^7$ relatively to its associated scales $I^{13}$ and $I^{14}$. As will be clear such movement of contact 12 will not affect the instrument operation when switch 15 is in its full line position, and greatly facilitates the instrument calibration operation since the said contact 12 will always be in the position corresponding to the then composition of the test gas whenever switch 15 is thrown to its dotted line position. Thus, with the apparatus so modified the only manual operations required for calibrating the instrument are adjustment of switch 15 and rheostat $K^2$. In this modified form of the apparatus means may desirably be provided, as shown in Figs. 2 and 2A, in the form of a detent $I^{15}$ to lock the driving mechanism for the shafts $I^5$ and $I^6$ against movement when switch 15 is in its dotted line position in order to prevent movement of contacts 9 and 12 when a calibrating operation is being made. The detent $I^{15}$ and switch 15 may desirably be actuated simultaneously, as for example, by means of the toggle switch $I^{16}$ illustrated in detail in Fig. 2A.

In Fig. 5 I have illustrated more or less diagrammatically a further modified arrangement of the apparatus described in connection with Figs. 2 and 3 in which the instrument calibrating adjustments may be effected semi-automatically. With this modified arrangement the switch 15 and contact 12 may be adjusted manually and the rheostat $K^2$ adjusted automatically. When this arrangement is employed the detent $I^{15}$ and toggle switch $I^{16}$ may preferably be dispensed with and a detent $I^{17}$ and toggle switch $I^{18}$, as shown in Fig. 5, employed in lieu thereof. In Fig. 5 an assembly of the detent $I^{17}$ and toggle $I^{18}$ together with the slidewire resistance 6 and resistance $K^2$ is illustrated. Such an assembly is illustrated in detail in the Harrison et al. Patent 2,150,502 referred to above and hence will be described only briefly herein. The means for adjusting shaft $I^6$ and thereby contact 9 along slidewire 6 includes a gear $I^{19}$ which is rigidly secured by a collar $I^{20}$ and an associated set screw to a shaft $I^{21}$. Shaft $I^{21}$ is journalled in a hollow shaft $I^{22}$ to which is secured by a set screw a hub $I^{23}$ of a serrated wheel $I^{24}$. Hollow shaft $I^{22}$ is journalled in collars $I^{25}$ in a stationary tube $I^{26}$. A collar $I^{27}$ is secured to the shaft $I^{21}$ by a set screw and is interposed between gear $I^{19}$ and the serrated wheel $I^{24}$ so as to maintain shaft $I^{21}$ in place when gear $I^{19}$ is moved. The tube $I^{26}$ is secured as by molding or in any other suitable manner into the molded support $I^{28}$. Molding $I^{28}$ has a top portion $I^{29}$ adapted to form a cap for the slidewire unit, and a cylindrical body portion $I^{30}$ depending from the top portion $I^{29}$. The cylindrical portion $I^{30}$ is hollow and the members, $I^{21}$, $I^{22}$, and $I^{26}$ extend axially therethrough. The cylindical portion $I^{30}$ is formed by molding with a pair of helical grooves $I^{31}$ which extend from top to bottom of the cylindrical portion and are adapted to receive a pair of coiled electrical resistors 6. The electrical resistors 6 are wound upon a body member of wire $I^{32}$, the ends of which are clamped beneath plates $I^{33}$ by pressure exerted by screws $I^{34}$ securing the plates $I^{33}$ to the molding, said screws being threaded into the molding. The coiled resistors 6 are tightly arranged in the helical grooves and the ends thereof secured by clamps $I^{33}$ adequately supported by the cylindrical body $I^{30}$ of the molding. The resistors 6 are evenly spaced throughout their length to provide a track $I^{35}$ in which the slidewire contact 9 may ride. The contact 9 is a small cylindrical body of electrical conducting material of a size to span the track $I^{35}$ formed between the resistors 6 and completes an electrical circuit therebetween, the resistors being bare along the points of contact. Contact 9 is arranged to ride in a slot $I^{36}$ in a frame $I^{37}$, the roller contact 9 being provided with reduced projections or pins $I^{38}$ which engage the inner faces of the plate $I^{37}$ adjacent the slot $I^{36}$ and prevent the roller or contact 9 from passing through slot $I^{36}$. Slot $I^{36}$ extends transversely with respect to the track $I^{35}$, and the plate $I^{37}$ is urged by spring $I^{39}$ disposed about the axis of the plate and cooperating with the supporting frame $I^{40}$ and the plate $I^{37}$ so that the contact 9 is maintained in position between the slot $I^{36}$ and the track $I^{35}$ as the contact moves over the resistors. The track $I^{35}$ provides a guide for moving the contact throughout the length of the resistors. Supporting frame $I^{40}$ is molded into and supported by an arm $I^{41}$ having a bushing $I^{42}$ molded therein into which the end of shaft $I^{21}$ is secured by a force fit or in any other suitable manner. Movement of the shaft $I^{21}$ by gear $I^{19}$ in response to movements of the wheel $I^{19}$ sweeps the supporting frame $I^{40}$ over the surface of the helically arranged resistors 6 carrying the contact 9 along the track formed between the resistors, thereby adjusting the position of contact 9. At the bottom of the cylindrical body of the molding $I^{28}$ is formed a pair of grooves adapted to accommodate a resistor $K^2$ of the same type and in the same manner as resistors 6. The resistor $K^2$ is formed in two parallel portions providing a track therebetween in which the contact $I^{44}$, similar to contact 9, rides, being supported thereagainst by the plate $I^{44}$ having a slot therein to accommodate the contact $I^{43}$. Plate $I^{44}$ is carried upon an arm $I^{45}$ rigidly connected to the hollow shaft $I^{22}$. Manipulation of the serrated wheel $I^{24}$ sweeps the plate $I^{44}$ over the resistor $K^2$ carrying the contact $I^{43}$ along the track therebetween.

Inasmuch as the calibrating resistor $K^2$ should not be adjusted at any time other than when switch 15 is in its dotted line position as seen in Fig. 3, it is desirable to lock the serrated wheel $I^{24}$ against movement when switch 15 is in its full line position. To this end the toggle switch $I^{18}$ is biased by spring or other means (not shown) whereby the detent $I^{17}$ is continuously held in engagement with the serrated wheel $I^{24}$ except at such times when the switch $I^{18}$ is moved by its operating handle $I^{46}$ in a clockwise direction against the opposing action of the spring means referred to. The switch $I^{18}$ is provided with an extension $I^{47}$ which is connected to the operating handle of switch 15 and adapted to adjust the latter into its full or dotted line position as seen in Fig. 3, as the detent $I^{17}$ is moved into or out of its normal position in engagement with the serrated wheel $I^{24}$.

When it is desired to standardize the current supplied the bridge network $b$, the operating handle $I^{46}$ of switch $I^{18}$ is manipulated manually to move switch 15 into its dotted line position, thereby placing the galvanometer in series with the calibrating resistor $K^3$ and at the same time moving the detent $I^{17}$ out of engagement with the wheel $I^{24}$. Wheel $I^{24}$ thus having been released from its locked position, will move with shaft $I^{21}$ and thereby adjust contact $I^{43}$ along resistors $K^2$ when contact 9 is moved along resistor 6. When the current through resistor $K^2$ has been adjusted to the desired value, the switch handle $I^{46}$ is released and the switch $I^{18}$ then moves the switch 15 to its full line position as seen in Fig. 3 due to the action of the spring means referred to, and also moves the detent $I^{17}$ into locking engagement with the wheel $I^{24}$. Thus, in calibrating the instrument it is necessary only to manually adjust contact 12 along resistor $K^3$ to the position corresponding to the then composition of the test gas and to manipulate handle $I^{46}$ whereupon the instrument automatically effects adjustment of rheostat $K^2$ to the position in which the deflection of galvanometer 10 is zero. The instrument calibration will then be correct and handle $I^{46}$ may then be released.

In Fig. 6, I have illustrated more or less diagrammatically a further modification of my invention in which all the instrument calibrating adjustments may be effected automatically. In this modification, it will be noted, the slidewire $K^3$ is also carried at the bottom of the cylindrical molding $I^{28}$ and is accommodated by a pair of grooves as are the resistors 6 and $K^2$. The resistor $K^3$ is formed with two parallel portions providing a track therebetween in which the contact 12 similar to contact 9 rides, being supported thereagainst by a plate (not shown) having a slot therein to accommodate the contact 12. Contact 12 is carried by an arm $I^{50}$ which is loosely pivoted on shaft $I^{21}$. In this modification the arm which carries contact 9 also carries a solenoid $I^{51}$, the iron core of which is adapted to cooperate with an iron portion $I^{52}$ carried by the arm $I^{50}$. Solenoid $I^{51}$ is normally energized so that contact 12 is moved relatively to the slidewire $K^3$ in unison with the movements of contact 9 along slidewire 6. The resistance of slidewire $K^3$ is so designed relatively to the resistance of slidewire 6 that the position to which contact 12 is adjusted whenever contact 9 is moved relatively to slidewire 6 will correspond to the composition of the gas then in the test cells. As will be apparent, the scale 11 may thus be dispensed with in this modification.

In this modification, means are provided whereby a calibrating adjustment is performed at fixed intervals comprising a continuously rotating cam $I^{53}$ which is in cooperative relation with the switch $I^{18}$ of the detent releasing mechanism. As illustrated, a contact arm $I^{54}$ carried by the switch $I^{18}$ is normally in engagement with a fixed contact $I^{55}$ but is moved out of engagement therewith in a cyclic manner as a result of rotation of cam $I^{53}$ whenever detent $I^{17}$ is moved out of engagement with the serrated wheel $I^{24}$. Switch arm $I^{54}$ and contact $I^{55}$ are connected in a series circuit with solenoid $I^{51}$ and a source of electrical current indicated as a battery $I^{56}$ so that when the circuit is closed between switch arm $I^{54}$ and contact $I^{55}$, the relay $I^{51}$ will be energized and contact 12 will follow the movements of contact 9. When the circuit is opened at switch arm $I^{54}$, relay $I^{51}$ will be deenergized and consequently contact 12 will remain stationary irrespective of the movements of contact 9. When switch arm $I^{54}$ is out of engagement with contact $I^{55}$, the detent $I^{17}$ is out of engagement with the serrated wheel $I^{24}$, and as noted in connection with Fig. 5, contact $I^{43}$ is then adjusted relatively to the slidewire $K^2$ to adjust the value of current supplied the bridge network. The continuing rotation of cam $I^{53}$ will thereafter bring switch arm $I^{54}$ into engagement with contact $I^{55}$ and also move detent $I^{17}$ into engagement with the serrated wheel $I^{24}$ to lock the contact $I^{43}$ against movement relatively to slidewire $K^2$. The solenoid $I^{51}$ will then again be energized and if close to the iron portion $I^{52}$ carried on contact 12, will attract the latter and cause contact 12 to follow any movements of contact 9.

If the calibrating movement of contact $I^{43}$ relative to the slidewire $K^2$ has been extensive, it is noted the contact 9 may be displaced a considerable amount from the position of contact 12 but when switch 15 has been restored to its full line position, contact 9 will move back to its former position in close proximity to the contact 12 and will thereafter cause the latter to follow its every movement during the remainder of the cycle of rotation of cam $I^{53}$. Thus, by means of the apparatus illustrated in Fig. 6, the calibration of the instrument may be effected in an entirely automatic manner and may be effected in sufficiently close intervals so that the calibration of the instrument is never permitted to deviate more than a slight extent from its correct value.

While in accordance with the provisions of the statutes, I have illustrated and described the best form of my invention now known to me, it will be apparent to those skilled in the art that changes may be made in the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. Means for calibrating a bridge network at any point throughout its range of measurement, said bridge network having a plurality of impedances, the magnitude of at least one of which is variable in accordance with changes in a variable condition under measurement, including a source of bridge energizing electrical current, means for producing an electrical potential of magnitude dependent upon the value of the condition being measured and upon the calibration of said network, a standard source of electrical potential, means for opposing said potentials, a device connected in circuit with said potentials for indicating differences in said potentials, and means for changing the calibration of said bridge network to reduce the difference of said potentials to zero.

2. Means for calibrating a bridge network at any point throughout its range of measurement, said bridge network having a plurality of impedances, the magnitude of at least one of which is variable in accordance with changes in a variable condition under measurement including a source of bridge energizing electrical current, automatically operating means for producing an electrical potential of magnitude dependent upon the value of the condition being measured and upon the calibration of said network, a standard source of electrical potential, manually operable means for opposing said potentials, a device connected in circuit with said potentials for indicating differences in said potentials, and manually operable means for changing the calibration of said bridge network to reduce the difference of said potentials to zero.

3. Means for calibrating a bridge network at any point throughout its range of measurement, said bridge network having a plurality of impedances, the magnitude of at least one of which is variable in accordance with changes in a variable condition under measurement, including a source of bridge energizing electrical current, manually operable means for producing an electrical potential of magnitude dependent upon the value of the condition being measured and upon the calibration of said network, a standard source of electrical potential, manually operable means for opposing said potentials, a device connected in circuit with said potentials for indicating differences in said potentials, and automatically operable means under control of said device for changing the calibration of said bridge network to reduce the difference of said potentials to zero.

4. Automatically operating means for calibrating a bridge network at any point throughout its range of measurement, said bridge network having a plurality of impedances, the magnitude of at least one of which is variable in accordance with changes in a variable condition under measurement, including a source of bridge energizing electrical current, means for producing an electrical potential of magnitude dependent upon the value of the condition being measured and upon the calibration of said network, a standard source of electrical potential, means for opposing said potentials, a device connected in circuit with said potentials for indicating differences in said potentials, and means under control of said device for changing the calibration of said bridge network to reduce the difference of said potentials to zero.

5. Means for calibrating a bridge network at any point throughout its range of measurement, said bridge network having a plurality of impedances and the magnitude of at least one of which is variable in accordance with changes in a variable condition including a source of bridge energizing electrical current, a device in circuit with said source adapted to be adjusted for varying the supply of energizing current to said bridge network, an impedance connected in circuit with said bridge network, said device, and said source of electrical current, a scale associated with said impedance, a contact in engagement with said impedance and movable relatively to said impedance and said scale, means for adjusting said contact to a position corresponding to the magnitude of the condition under measurement, a standard source of potential, a connection from one end of said impedance to said movable contact including said standard source of potential in opposition to the potential drop produced across said impedance by the flow of bridge energizing current therethrough, a device connected in circuit with said standard source of potential and said impedance for indicating differences in said potentials, and means for changing the value of bridge energizing current to reduce the difference of said potential to zero comprising means for adjusting said first mentioned device.

6. Means for calibrating a bridge network at any point throughout its range of measurement, said bridge network having a plurality of resistances and the magnitude of at least one of which is variable in accordance with changes in a variable condition under measurement including a source of bridge energizing electrical current, a device in circuit with said source adapted to be adjusted for varying the supply of energizing current to said bridge network, a resistance connected in circuit with said bridge network, said device and said source of electrical current, a scale associated with said resistance, a contact in engagement with said resistance and movable relatively to said resistance and said scale, means for adjusting said contact to a position corresponding to the magnitude of the condition under measurement, a standard source of potential, a connection from one end of said resistance to said movable contact including said standard source of potential in opposition to the potential drop produced across said resistance by the flow of bridge energizing current therethrough, a device connected in circuit with said standard source of potential and said resistance for indicating differences in said potentials, and means for changing the value of bridge energizing current to reduce the difference of said potentials to zero comprising means for adjusting said first mentioned device.

7. The method of calibrating an electrical current energized comparison cell, used for determining the composition of a gas and in which the current varies in accordance with the composition of said gas, at any point throughout its range of measurement, said comparison cell being characterized by the fact that when it is properly calibrated the current supplied thereto is a predetermined value which is different for every different composition of said gas, which comprises the steps of determining the composition of gas being measured, and adjusting the current supplied the comparison cell to the predetermined value corresponding to the composition of the gas being measured.

8. In determining the composition of a gas by comparison cell measurements of its thermal conductivity, an electrical current energized comparison cell in which the current varies in accordance with the composition of said gas, means for calibrating the comparison cell at any point throughout its range of measurement including means to determine the thermal conductivity of the gas under measurement and means controlled by said determining means for adjusting the current supplied the comparison cell to a value corresponding to the thermal conductivity of the gas under measurement.

9. In determining the composition of a gas by comparison cell measurements of its thermal conductivity, means for calibrating the comparison cell at any point throughout its range of measurement including a standard source of electrical potential, means for producing an electrical potential variable in accordance with the composition of the gas under measurement and with the changes in the calibration of said comparison cell, means for opposing said potentials, a device connected in circuit with said potentials for indicating differences therein, and means for changing the calibration of said comparison cell to reduce the difference of said potentials to zero.

10. Means for determining the composition of a gas by comparison cell measurements of its thermal conductivity including means for supplying electrical current to said cell, automatically operating means for producing an electrical potential variable in accordance with the composition of the gas under measurement and with changes in the calibration of said comparison cell, a standard source of electrical potential, manually operable means for opposing said potentials, a device connected in circuit with said potentials for indicating differences therein, and manually operable means for changing the calibration of said comparison cell to reduce the difference of said potentials to zero.

11. Means for determining the composition of a gas by comparison cell measurements of its thermal conductivity including means for supplying electrical current to said cell, manually operable means for producing an electrical potential variable in accordance with the composition of the gas under measurement, and with change in the calibration of said comparison cell, a standard source of electrical potential, manually operable means for opposing said potentials, a device connected in circuit with said potentials for indicating differences therein, and automatically operating means under control of said device for changing the calibration of said comparison cell to reduce the difference of said potentials to zero.

12. Automatically operating means for determining the composition of a gas by comparison cell measurements of its thermal conductivity including means for producing an electrical potential dependent upon the composition of the gas being measured and upon the calibration of said comparison cell, a standard source of electrical potential, means for opposing said potentials, a device connected in circuit with said potentials for indicating differences therein, and means for changing the calibration of said comparison cell to reduce the difference of said potentials to zero.

EARL A. KEELER.